(12) United States Patent
Imahashi et al.

(10) Patent No.: US 8,422,442 B2
(45) Date of Patent: Apr. 16, 2013

(54) RADIO COMMUNICATION APPARATUS

(75) Inventors: Naoya Imahashi, Fukuoka (JP); Souichi Kawata, Fukuoka (JP)

(73) Assignee: Panasonic Corporation, Osaka (JP)

( * ) Notice: Subject to any disclaimer, the term of this patent is extended or adjusted under 35 U.S.C. 154(b) by 577 days.

(21) Appl. No.: 12/664,635

(22) PCT Filed: Jun. 12, 2008

(86) PCT No.: PCT/JP2008/001508
§ 371 (c)(1),
(2), (4) Date: Dec. 14, 2009

(87) PCT Pub. No.: WO2008/152813
PCT Pub. Date: Dec. 18, 2008

(65) Prior Publication Data
US 2010/0183061 A1    Jul. 22, 2010

(30) Foreign Application Priority Data

Jun. 13, 2007  (JP) .................................. 2007-156031

(51) Int. Cl.
*H04W 74/00*    (2009.01)
(52) U.S. Cl.
USPC ........................... 370/329; 370/337; 370/345
(58) Field of Classification Search .................. None
See application file for complete search history.

(56) References Cited

U.S. PATENT DOCUMENTS

| 5,533,099 | A | * | 7/1996 | Byrne ........................... 455/552.1 |
| 5,732,073 | A | * | 3/1998 | Kusaki et al. ................. 370/280 |
| 7,117,008 | B2 | * | 10/2006 | Bajikar ......................... 455/552.1 |
| 7,193,965 | B1 | * | 3/2007 | Nevo et al. .................... 370/230 |
| 7,388,903 | B2 | * | 6/2008 | Godfrey ........................ 375/219 |
| 7,924,765 | B2 | * | 4/2011 | Chen et al. .................... 370/321 |
| 8,081,718 | B2 | * | 12/2011 | Godfrey ........................ 375/340 |
| 2003/0125019 | A1 | * | 7/2003 | Bajikar ......................... 455/420 |
| 2004/0052307 | A1 | * | 3/2004 | Godfrey ........................ 375/219 |
| 2004/0137849 | A1 | * | 7/2004 | Kloper et al. ............. 455/67.11 |
| 2008/0247336 | A1 |  | 10/2008 | Sugitani |
| 2012/0106457 | A1 | * | 5/2012 | Frank et al. ................... 370/328 |

FOREIGN PATENT DOCUMENTS

| JP | 4-287434 | 10/1992 |
| JP | 7-274256 | 10/1995 |
| JP | 9-326751 | 12/1997 |
| JP | 2005-286754 | 10/2005 |
| JP | 2005-538653 | 12/2005 |
| WO | 2004/025928 | 3/2004 |

* cited by examiner

*Primary Examiner* — Robert Scheibel
(74) *Attorney, Agent, or Firm* — Dickinson Wright PLLC

(57) ABSTRACT

There is provided a radio communication apparatus that performs communication in a plurality of different radio communication systems independently of one another and is capable of normally performing data communication with interference in the data communication avoided. The radio communication apparatus includes modems respectively corresponding to DECT communication and GSM communication respectively utilizing close frequency bands for transmitting/receiving data, and is configured so that communication time slots not used for time division multiplex domestic radio communication or for time division multiplex subscriber channel radio communication may be adjusted between the modems by a modem controller 208 for avoiding simultaneous communication timing.

13 Claims, 15 Drawing Sheets

RADIO COMMUNICATION APPARATUS

TECHNICAL FIELD

The present invention relates to a radio communication apparatus employing a plurality of different radio communication systems.

BACKGROUND ART

Recently, radio communication such as cordless telephones and radio LAN for domestic use or the like have been spread. Also, as means for reducing time and effort necessary for laying cables as a public line, a telephone system capable of performing local area radio connection and wide area radio connection in parallel has been known (see Patent Document 1).

Patent Document 1: JP-T-2005-538653

DISCLOSURE OF THE INVENTION

Problem to be Solved by the Invention

In the aforementioned telephone system, however, when a domestic radio frequency and a subscriber channel radio frequency are rather away from each other, data communication can be performed in parallel without causing frequency interference, but when these frequencies are close to each other, if the timings of data communications collide with each other, there arises a problem that the data communication cannot be normally performed because of interference. There has been a demand for a data transfer system for overcoming this problem capable of normally performing data communications even when the data communications are performed in parallel.

An object of the invention is providing a radio communication apparatus that performs communication by employing a plurality of different radio communication systems independently of one another and is capable of normally performing data communication with interference of the data communication avoided.

Means for Solving the Problem

The present invention provides a radio communication apparatus that transmits/receives data by employing different radio communication systems respectively utilizing frequency bands close to one another and is configured to adjust communication time slots not used for time division multiplex domestic radio communication or for time division multiplex subscriber channel radio communication so as to avoid communications performed at the same timing.

Owing to this configuration, simultaneous communication operations can be avoided, resulting in avoiding frequency interference.

Advantageous Effects of the Invention

According to the present invention, a radio communication apparatus for transmitting/receiving data by employing different radio communication systems respectively utilizing frequency bands close to one another is configured to adjust communication time slots not used for time division multiplex domestic radio communication or time division multiplex subscriber channel radio communication so as to avoid communications performed at the same timing. Therefore, simultaneous communication operations can be avoided, resulting in avoiding frequency interference, and in particular in a communication state of voice communication or the like where a real time property is required, efficient radio communication may be realized without spoiling communication quality.

Figure 1:
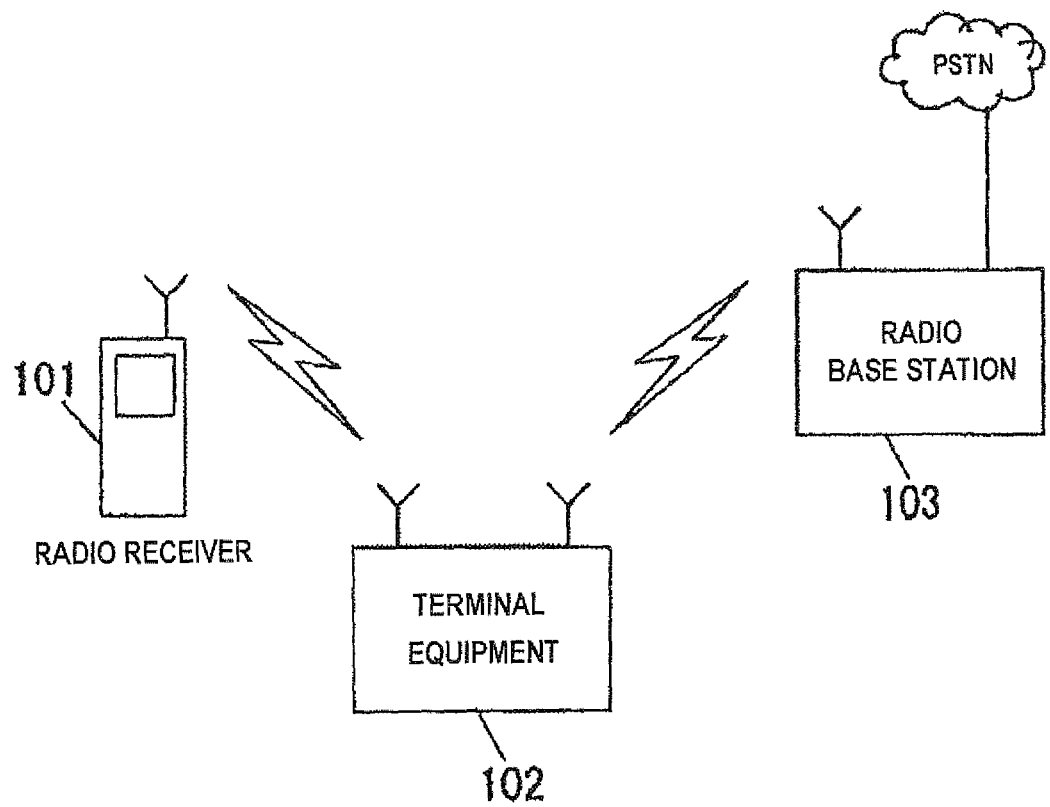
FIG. 1 is a diagram illustrating an architecture of a communication system according to Embodiment 1 of the invention.

DESCRIPTION OF REFERENCE NUMERALS 101 radio receiver
102 terminal equipment
103 radio base station
202 first antenna
203 second antenna
204 first radio communication interface
205 second radio communication interface
206 domestic radio modem
207 subscriber channel radio modem
208 model controller
209 controller
210 memory Best Mode for Carrying Out the Invention A first aspect of the invention is configured to provide a radio communication apparatus for performing radio communication in a first frequency band and a second frequency band, the radio communication apparatus including: a first radio interface which modulates/demodulates a first frequency band signal; a first modem connected to the first radio interface; a second radio interface which modulates/demodulates a second frequency band signal; a second modem connected to the second radio interface; and a modem controller which relays signals between the first and second modems, wherein, when the modem controller determines on the basis of information supplied from the first and second modems that transmitting/receiving timing of first radio communication collides with transmitting/receiving timing of second radio communication, the modem controller directs the first modem to avoid collision of data on a time axis.

Thus, different radio systems may be included in one apparatus.

A second aspect of the invention is configured in the first aspect, so that the first modem employs a Time Division Multiple Access as a communication system.

Thus, the communication by the first modem may be easily controlled on a time division basis.

A third aspect of the invention is configured in the first or second aspects, so that center frequencies in the radio communications of the first and second modems are close to each other.

Thus, a system improved in the efficiency in using a frequency may be provided.

A fourth aspect of the invention is configured in the first or second aspects, so that the modem controller determines whether or not the transmitting/receiving timings collide with each other on the basis of transmit/receive control information obtained from the first and second modems.

Thus, information included in the transmit/receive control information (such as communication cycles of the first modem and the second modem) may be recognized, so as to easily discriminate collision on a time axis.

A fifth aspect of the invention is configured in the first or second aspects, so that the modem controller determines whether or not the transmitting/receiving timings collide with each other on the basis of received signal strength input from the first and second antennas obtained from the first and second modems.

Thus, the timing of a receiving operation may be recognized on the basis of the received signal strength, so as to easily discriminate the collision on the time axis.

A sixth aspect of the invention is configured in the fourth or fifth aspects, so that the first modem halts transmitting in receiving a directive from the modem controller that receiving timing of the second modem collides with transmitting timing thereof.

Thus, the collision on the time axis may be easily avoided.

A seventh aspect of the invention is configured in the sixth aspect, the first modem changes a position of data in a next frame and incorporates a content of change into control data.

Thus, a communication slot not colliding in communication time with the first modem may be selectively informed.

An eighth aspect of the invention is configured in the fourth or fifth aspects, so that the first modem is configured to control communication of frame data in which the same data is allocated to a plurality of communication slots, and in receiving a directive from the modem controller that receiving timing of the second modem collides with transmitting timing thereof, the first modem discards the data contained in a colliding communication slot and rewrites the control data for selecting another communication slot containing the same data.

Thus, the collision on the time axis may be easily avoided.

A ninth aspect of the invention is configured to provide a radio communication apparatus for performing radio communication in a first frequency band and a second frequency band, the radio communication apparatus including: a first radio interface which modulates/demodulates a first frequency band signal; a first modem connected to the first radio interface; a second radio interface which modulates/demodulates a second frequency band signal; a second modem connected to the second radio interface; and a modem controller which relays signals between the first and second modems, wherein the modem controller transmits transmitting/receiving timing of first radio communication obtained from the first modem to the second modem and transmits transmitting/receiving timing of second radio communication obtained from the second modem to the first modem.

Thus, the first modem and the second modem may mutually recognize the transmitting/receiving timings thereof, so as to easily avoid the collision on the time axis.

A tenth aspect of the invention is configured in the ninth aspect, so that the first modem controls transmitting/receiving of the first radio communication so as to avoid collision with transmitting/receiving timing of the second radio communication supplied from the modem controller.

Thus, the collision on the time axis may be easily avoided.

An eleventh aspect of the invention is configured in the tenth aspect, so that the first modem selects a communication slot of data in a transmitting frame so as to avoid collision with the transmitting/receiving timing of the second radio communication.

Thus, the collision on the time axis may be easily avoided.

A twelfth aspect of the invention is configured in the tenth aspect, so that the first modem selects a communication slot of control data in a transmitting frame so as to avoid collision with the transmitting/receiving timing of the second radio communication.

Thus, the collision on the time axis may be easily avoided.

Furthermore, in an alternative first aspect, the radio communication apparatus may include a first antenna; a first radio interface which modulates/demodulates a signal from the first antenna; a first modem connected to the first radio interface; a second antenna; a second modem connected to the second antenna; a second radio interface which modulates/demodulates a signal from the second antenna; a second modem connected to the second radio interface; and a modem interface which relays signals between the first and second modems, and the first radio interface and the second radio interface may use different frequency bands.

Thus, different radio systems may be included in one apparatus.

As an alternative second aspect, the first and second modems may perform communication by employing a Time Division Multiple Access as a communication system in the alternative first aspect.

Thus, the communication of the respective modems may be controlled on a time division basis.

As an alternative third aspect, center frequencies used in radio communication performed in the first and second modems may be close to each other in the alternative first aspect.

Thus, a system improved in the efficiency in using a frequency may be provided.

As an alternative fourth aspect, data transferred through the first and second antennas is controlled so as not to collide on a time axis in the alternative first aspect.

Thus, frequency interference may be easily avoided through division in the time axis direction.

As an alternative fifth aspect, received signal strength input from the first and second antennas may be monitored in the alternative first aspect.

Thus, the timing of a receiving operation may be easily obtained.

As an alternative sixth aspect, the first modem may be operated with a given time difference from the second modem, and a cycle of a receiving operation may be calculated on the basis of receiving timing with the second modem, so as to calculate timing for operating the first modem in the alternative fourth aspect.

Thus, collision on a time axis may be easily grasped.

As an alternative seventh aspect, while the second antenna is receiving, transmitting from the first antenna may be halted in the alternative fourth aspect.

Thus, the collision on the time axis may be easily avoided.

As an alternative eighth aspect, while the second antenna is receiving, starting time of a reference signal transmitted from the first antenna may be shifted in the alternative fourth aspect.

Thus, the collision on the time axis may be easily grasped.

As an alternative ninth aspect, when the second antenna is receiving and a radio signal input from the second antenna is interfered by a radio signal output from the first antenna and the threshold level of the signal input from the second antenna is degraded to a level at which data cannot be correctly reproduced, the transmitting from the first antenna may be controlled in the alternative seventh or eighth aspect.

Thus, a load in an operation for avoiding the collision on the time axis may be reduced.

As an alternative tenth aspect, the first modem allocates the same data to a plurality of communication slots out of data communication slots of time division multiplex, and in a communication slot in which operation timing of data transmitting of the first modem collides with data receiving of the second modem, the data transmitting of the first modem may be halted in the alternative fourth aspect.

Thus, the collision on the time axis may be easily avoided.

As an alternative eleventh aspect, the first modem allocates the same data to a plurality of communication slots out of data communication slots of time division multiplex, and in a communication slot in which operation timing of data transmitting of the first modem collides with data transmitting of the second modem, the data transmitting of the first modem may be halted in the alternative fourth aspect.

Thus, the collision on the time axis may be easily avoided.

As an alternative twelfth aspect, the first modem allocates the same data to a plurality of communication slots out of data communication slots of time division multiplex, and in a communication slot in which operation timing of data receiving of the first modem collides with data receiving of the second modem, the first modem may select a communication slot in which the timings do not collide with each other for reproducing data in the alternative fourth aspect.

Thus, the collision on the time axis may be easily avoided.

As an alternative thirteenth aspect, the first modem allocates the same data to a plurality of communication slots out of data communication slots of time division multiplex, and in a communication slot in which operation timing of data receiving of the first modern collides with data transmitting of the second modem, the first modem may select a communication slot in which the timings do not collide with each other for reproducing data in the alternative fourth aspect.

Thus, the collision on the time axis may be easily avoided.

As an alternative fourteenth aspect, the first modem and the second modem may mutually calculate data communication time periods thereof, and the first modem may perform communication on a different cycle by avoiding communication timing of the second modem in the alternative fourth aspect.

Thus, the collision on the time axis may be easily avoided.

As an alternative fifteenth aspect, the first modem and the second modem may be mutually informed of communication intervals thereof in the alternative fourth aspect.

Thus, the collision on the time axis may be easily avoided.

As an alternative sixteenth aspect, the radio communication apparatus of the alternative fifteenth aspect may include a controller for controlling communication times suitable to the first and second modems.

Thus, the collision on the time axis may be easily avoided.

As an alternative seventeenth aspect, the first modem may select a slot not colliding with communication of the second modem as a time division multiplex data communication slot in the alternative fourth aspect.

Thus, the collision on the time axis may be easily avoided.

As an alternative eighteenth aspect, the first modem may select a time division multiplex communication starting point in a slot not colliding with communication of the second modem in the alternative fourth aspect.

Thus, the collision on the time axis may be easily avoided.

Now, preferred embodiments of the invention will be described with reference to the accompanying drawings. It is noted that the embodiments described below may be mutually combined in related fields.

(Embodiment 1)

Embodiment 1 of the invention will now be described.

FIG. 1 is a diagram illustrating an architecture of a communication system according to Embodiment 1 of the invention.

In FIG. 1, the communication system of this embodiment includes a terminal equipment 102 that performs radio communication with a radio receiver 101 by employing a first communication system and performs radio communication with a radio base station 103 by employing a second communication system.

In Embodiment 1, an exemplary case where DECT (Digital Enhanced Cordless Telecommunications) is employed as the first communication system and GSM (Global System for Mobile Communications) is employed as the second communication system will be basically described. Accordingly, the terminal equipment 102 includes a GSM modem of a wide area radio telephone type and a DECT modem of a cordless telephone type.

The radio receiver 101 includes a modem compatible with the DECT modem of the terminal equipment 102, and when a user talks on the telephone with another user, he/she speaks to a microphone of the radio receiver 101. The radio receiver 101 creates voice data by processing received voice and transmits the voice data to the terminal equipment 102 through the modem included therein.

The terminal equipment 102 processes the voice data received from the radio receiver 101 with the DECT modem and transmits the processed data to a GSM radio network through the GSM modem. The radio base station 103 allows the voice data to pass to a PSTN (Public Switched Telephone Network).

On the other hand, with respect to voice data entering from the GSM radio network, the terminal equipment 102 receives and processes voice data supplied from the radio base station 103 though the GSM modem and transmits the processed data to the radio receiver 101 through the DECT modem.

The radio receiver 101 receives voice data, and processes the received voice data for outputting corresponding voice through a speaker.

Owing to the aforementioned system architecture, in Embodiment 1, a user can transmit/receive voice data to/from the PSTN through the terminal equipment 102 from the radio receiver 101, that is, a cordless telephone by using the GSM, that is, a subscriber channel radio interface. In this manner, a user obtains a mobility profit in a focal area environment through cordless connection between the radio receiver 101 and the terminal equipment 102. Furthermore, the user obtains a profit of the subscriber channel radio connection between the terminal equipment 102 and the PSTN.

Although the first radio connection between the terminal equipment 102 and the radio receiver 101 is described as the DECT and the second radio connection between the terminal equipment 102 and the radio base station 103 is described as the GSM, the radio connection systems are not limited to them.

An alternative example of the first radio connection is, apart from the DECT, a system employing a time division multiplex communication system such as cordless type telephone connection or IEEE802.11 connection (Wi-Fi).

Furthermore, an alternative example of the second radio connection is, apart from the GSM, wide area radio connection such as cellular connection, PCS (Personal Communications Service) connection, WiMAX (Worldwide Interoperability for Microwave Access) or fixed radio connection.

Although the radio network formed by the second radio connection is a dedicated radio network of a subscriber channel in this embodiment, it may be a cellular network also used for mobile radio receivers (such as cellular phones) or a PCS network as an alternative embodiment.

Moreover, the radio base station 103 is connected to the PSTN. As an alternative embodiment, the radio base station 103 may be connected to a different telephone network such as a private exchange or a private cellular network.

Figure 2:
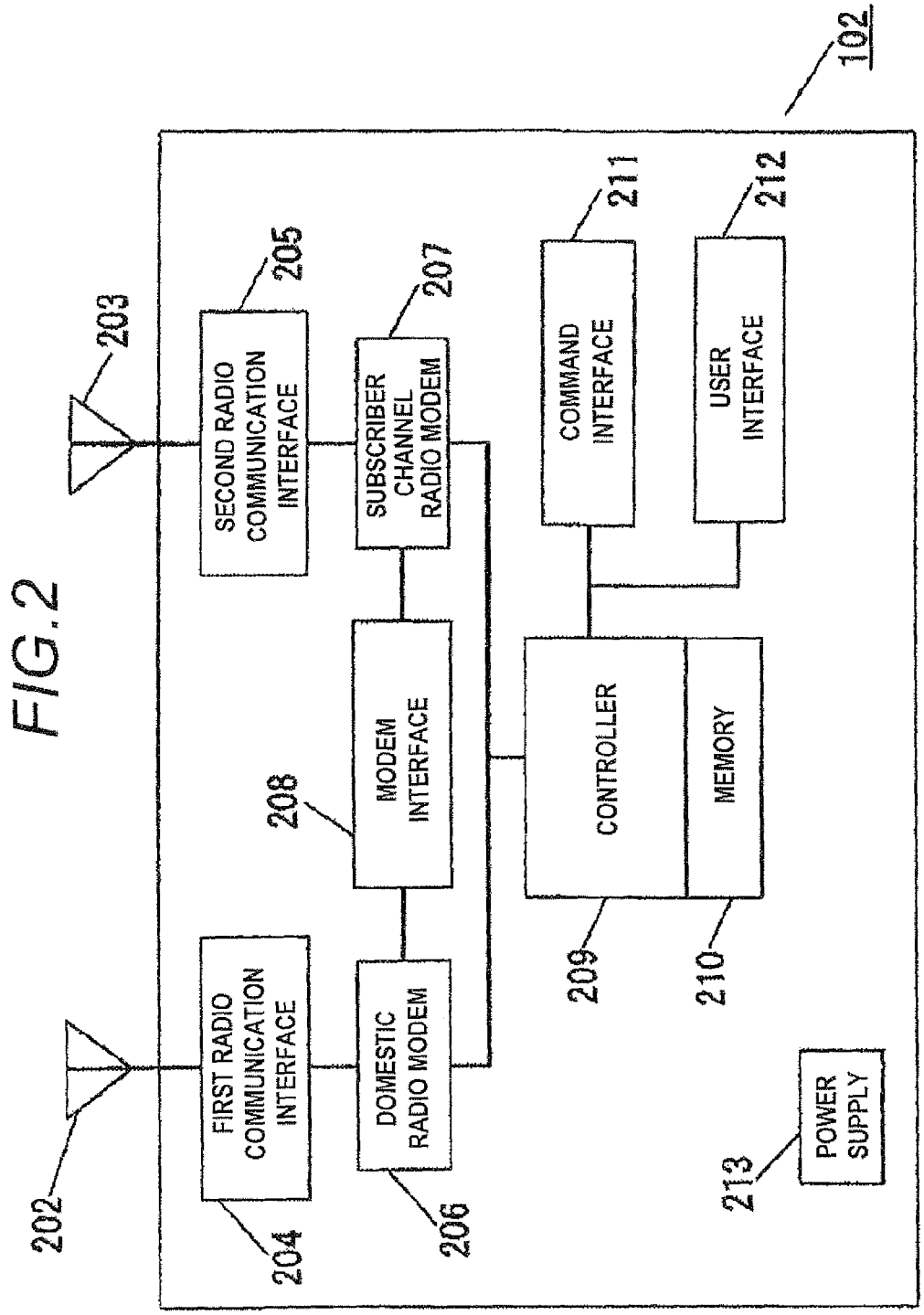
FIG. 2 is a configuration diagram of a terminal equipment according to Embodiment 1 of the invention.

FIG. 2 is a configuration diagram of a terminal equipment according to Embodiment 1 of the invention, and illustrates the configuration of the terminal equipment 102 of FIG. 1.

In FIG. 2, the terminal equipment 102 includes a domestic radio modem 206 (a first radio modem) and a subscriber channel radio modem 207 (a second radio modem).

The domestic radio modem 206 and the subscriber channel radio modem 207 are different radio telephone communication modems.

The subscriber channel radio modem 207 works for retaining a protocol or a radio wave interface for communication between radio telephone connection and a radio network such as CDMA, TDMA or GSM.

A second radio communication interface 205 connected between the subscriber channel radio modem 207 and a second antenna 203 is a typical radio interface and includes a radio frequency (RF) component, a duplexer, a low noise amplifier (LNA), a band-pass filter (BPF), an insulating device and a power amplifier. In order to transmit a signal through the subscriber channel radio connection, the subscriber channel radio modem 207 supplies a conversion signal to the second radio communication interface 205.

In the second radio communication interface 205, the RF component supplies the modulation signal from the subscriber channel radio modem 207 to the power amplifier. The power amplifier supplies an amplified signal to the insulating device, and the insulating device then supplies the signal to the duplexer and the second antenna 203.

In order to receive a signal through the subscriber channel radio connection, the second antenna 203 supplies a signal received from the radio network to the duplexer. The duplexer supplies the signal to the LNA for supplying an amplified signal to the BPF. The BPF supplies a filtered signal to the RF component, and the RF component supplies the signal to the subscriber channel radio modem 207.

On the other hand, the domestic radio modem 206 works for retaining a protocol or a radio wave interface for local connection or short range connection between radio telephone connection and digital radio connection or a radio device or a receiver employing a time division multiplex communication system such as radio LAN connection (such as 802.11, that is, "Wi-Fi").

The domestic radio modem 206 is connected to a first antenna 202 and a first radio communication interface 204. The first radio communication interface 204 and the first antenna 202 performs similar operations to those of the second radio communication interface 205 and the second antenna 203, so as to transmit/receive signals to/from the domestic radio modem 206 and the radio receiver 101.

The subscriber channel radio modem 207 and the domestic radio modem 206 are both connected to a modem controller 208.

The modem controller 208 processes and delivers signals between the two modems. The modem controller 208 retains data delivery between the radio receiver 101 and the radio network by providing an arbitrary dialog of signals and data, namely, formatting.

For example, the modem controller 208 receives a modulation signal from the domestic radio modem 206 and creates a signal for the subscriber channel radio modem 207 through preprocessing of the modulation signal. In an alternative embodiment, the subscriber channel radio modem 207 and the domestic radio modem 206 supply output data in a format appropriate to the opponent modem, so as to directly work together. In this case, the modem controller 208 is omitted in or integrated with the modem.

The terminal equipment 102 includes a controller 209 and a memory 210 for retaining and controlling the operation of the terminal equipment 102. The controller 209, the domestic radio modem 206 and the subscriber channel radio modem 207 work together to transmit/receive telephone calls through the radio network.

The controller 209 is connected to a command interface 211. The command interface 211 processes a command for the radio receiver 101 received by the terminal equipment 102 and a command for the terminal equipment 102 received from the radio receiver 101. The controller 209 and the command interface 211 work in association with each other for allowing a received command to be executed.

The terminal equipment 102 further includes a power source 213 connected to a powered component and a user interface 212 such as a ringer or a display.

Figure 3:
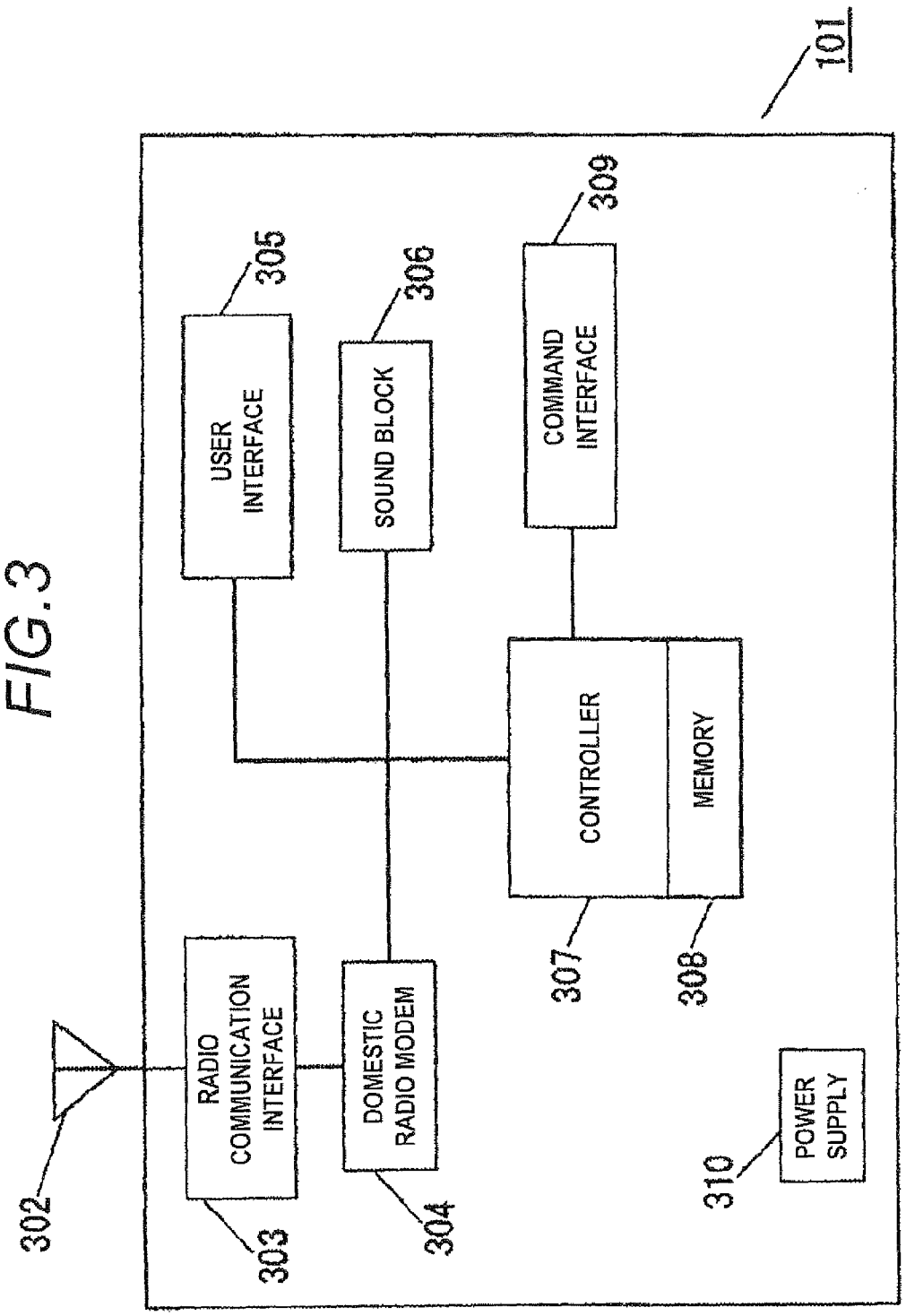
FIG. 3 is a configuration diagram of a radio receiver according to Embodiment 1 of the invention.

FIG. 3 is a configuration diagram of a radio receiver according to Embodiment 1 of the invention and illustrates the configuration of the radio receiver 101 of FIG. 1.

In FIG. 3, a domestic radio modem 304 is a radio telephone communication modem, and works to retain a protocol or a radio wave interface for local connection or short range connection between radio telephone connection and a radio device or a receiver such as typical digital cordless connection, or a protocol or a radio wave interface employing a time division multiplex system for radio LAN connection (such as 802.11, namely, "Wi-Fi").

The domestic radio modem 304 is connected to a radio communication interface 303 also connected to an antenna 302. The radio communication interface 303 and the antenna 302 perform similar operations as those of the first radio communication interface 204 and the first antenna 202, so as to transmit/receive signals to/from the domestic radio modem 304 and the terminal equipment 102.

The radio receiver 101 includes a controller 307 and a memory 308 for retaining and controlling the operation of the radio receiver 101. The controller 307 and the domestic radio modem 304 work together for transmitting/receiving telephone calls through the terminal equipment 102 and the radio network.

The controller 307 is connected to a command interface 309. The command interface 309 processes a command for the terminal equipment 102 received by the radio receiver 101 and a command for the radio receiver 101 received from the terminal equipment 102. The controller 307 and the command interface 309 work in association with each other for executing a received command.

The radio receiver 101 includes additional components typical to a cordless type telephone receiver, that is, a power source 310 connected to a powered component of the radio receiver 101, a sound block 306 including a microphone and a speaker, and a user interface 305 such as a keypad, a ringer and a display.

The terminal equipment 102 and the radio receiver 101 further work together so that a user may transmit/receive a telephone call through a telephone network connected to the subscriber channel radio network of the terminal equipment 102. For example, the radio receiver 101 and the terminal equipment 102 provide basic subscriber channel telephone functions such as a simulation dial tone function and an automatic pulse transmission function.

Figure 4:
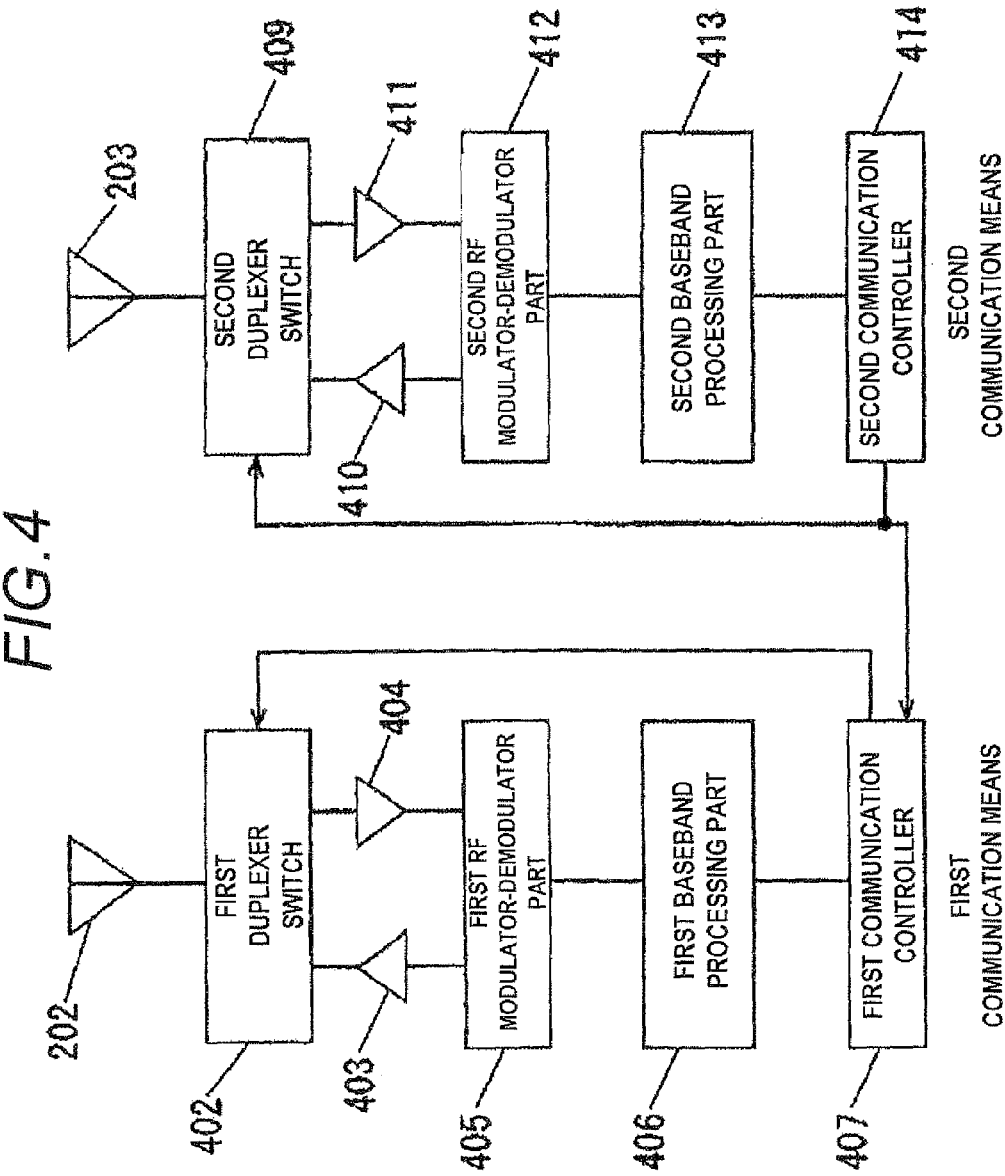
FIG. 4 is a diagram illustrating a control mechanism of the terminal equipment of Embodiment 1 of the invention.

FIG. 4 is a diagram illustrating the functional configuration of a terminal equipment according to Embodiment 1 of the invention, and illustrates a portion corresponding to a communication processing performed in the terminal equipment 102 of FIG. 2.

As illustrated in FIG. 4, the terminal equipment 102 independently includes first communication means of the cordless telephone type (DECT) and second communication means of the subscriber channel radio (GSM).

At this point, the correspondence between FIG. 2 and FIG. 4 will be described.

A first communication controller 407 and a second communication controller 404 of FIG. 4 are realized by the modem controller 208 of FIG. 2.

A first baseband processing part 406 of FIG. 4 is realized by the domestic radio modem 206 of FIG. 2. A first duplexer switch 402, a first power amplifier 403, a first LNA 404 and a first RF modulator-demodulator part 405 are realized by the first radio communication interface 204 of FIG. 2.

A second baseband processing part 413 of FIG. 4 is realized by the subscriber channel radio modem 207 of FIG. 2. A second duplexer switch 409, a second power amplifier 410, a second LNA 411 and a second RF modulator-demodulator part 412 are realized by the second radio communication interface of FIG. 2.

In the first communication means of FIG. 4, the first communication controller 407 has functions to process transmit/receive data of voice data transmitted to/from the radio receiver 101 and to control transmitting, receiving and the like of radio communication. The first baseband processing part 406 performs modulation/demodulation of voice data through baseband processing by a domestic cordless telephone modem and encoding/decoding for data packets. The first RF modulator-demodulator part 405 performs modulation/demodulation of data having been subjected to baseband modulation into a carrier frequency of the radio frequency by the first baseband processing part 406. For transmitting data, the first power amplifier 403 amplifies the power of RF data, and when the first duplexer switch 402 is in a state for activating transmission, the data is transmitted as radio data to the space through the first antenna 202. For receiving data, radio data received through the first antenna 202 is allowed to pass through the first duplexer switch 402 and subjected to data signal amplification by the first LNA 404, and the resultant RF signal is demodulated by the first RF modulator-demodulator part 405.

Furthermore, in the second communication means, the second communication controller 414 has functions to process transmit/receive data of voice data transmitted to/from the radio base station 103 and to control transmitting, receiving and the like of radio communication. The second baseband processing part 413 performs modulation/demodulation of voice data through baseband processing of a domestic cordless telephone modem and encoding/decoding for data packets. The second RF modulator-demodulator part 412 performs modulation/demodulation of data having been subjected to baseband modulation into a carrier frequency of the radio frequency by the second baseband processing part 413. For transmitting data, the second power amplifier 410 amplifies the power of RF data, and when the second duplexer switch 409 is in a state for activating transmission, the data is transmitted as radio data to the space through the second antenna 208. For receiving data, radio data received through the second antenna 408 is allowed to pass through the second duplexer switch 409 and subjected to data signal amplification by the second LNA 411, and the resultant RF signal is demodulated by the second RF modulator-demodulator part 412.

At this point, the transmit/receive control on the side of the first communication means is performed at timing not colliding in time with each other by using the transmit/receive control of the first communication controller 407 and a transmit/receive control signal controlled by the communication controller of the second communication controller 414.

Incidentally, a timing control signal supplied from the second communication means for the transmit/receive control of the first communication means is provided through calculation of the periodicity of communication data on the basis of control data transmitted from the radio base station 103 and decoded by the second communication means. As a method for detecting the periodicity of receive data of the second communication means, receiving timing may be provided on the basis of a received signal strength indicator (RSSI) signal input from the second antenna 203.

An exemplary operation performed by the terminal equipment 102 having the aforementioned configuration with the DECT system used as the first communication means and the GSM system used as the second communication means will now be described.

Figure 5:
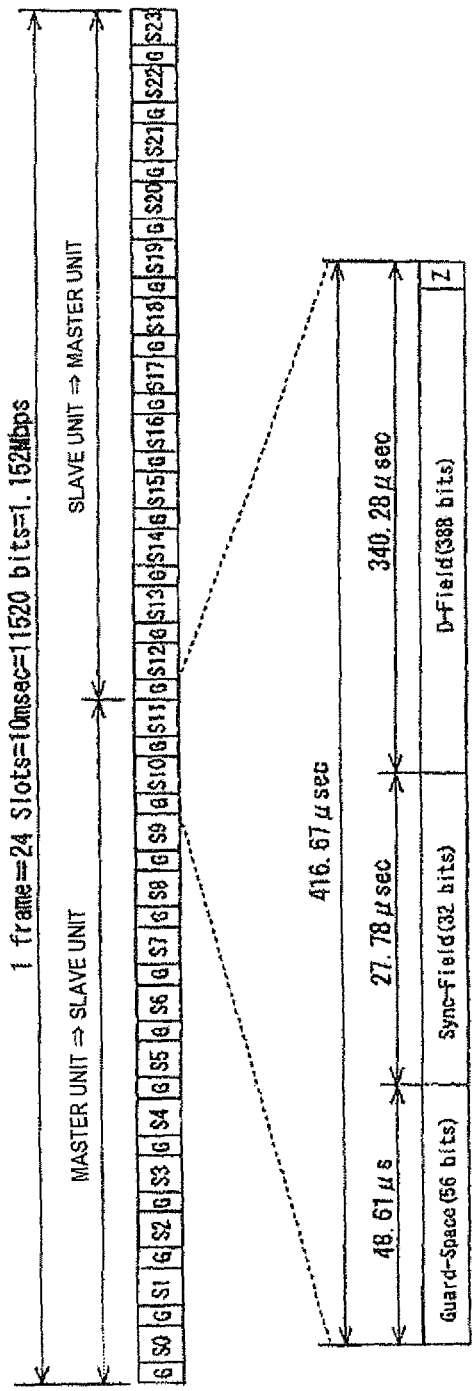
FIG. 5 is a diagram illustrating a frame format of DECT used in Embodiment 1 of the invention.

FIG. 5 is a diagram illustrating a frame format of the DECT employed in Embodiment 1 of the invention.

As illustrated in FIG. 5, the DECT system is a time division multiplex system and realizes multiple communication with a slave unit on a time division basis using one frequency by updating information of each slot at intervals of one frame of 10 ms and dividedly performing signal transmission from a master unit to the slave unit and signal transmission from the slave unit to the master unit respectively in a first half and a second half of each frame.

Figure 6:
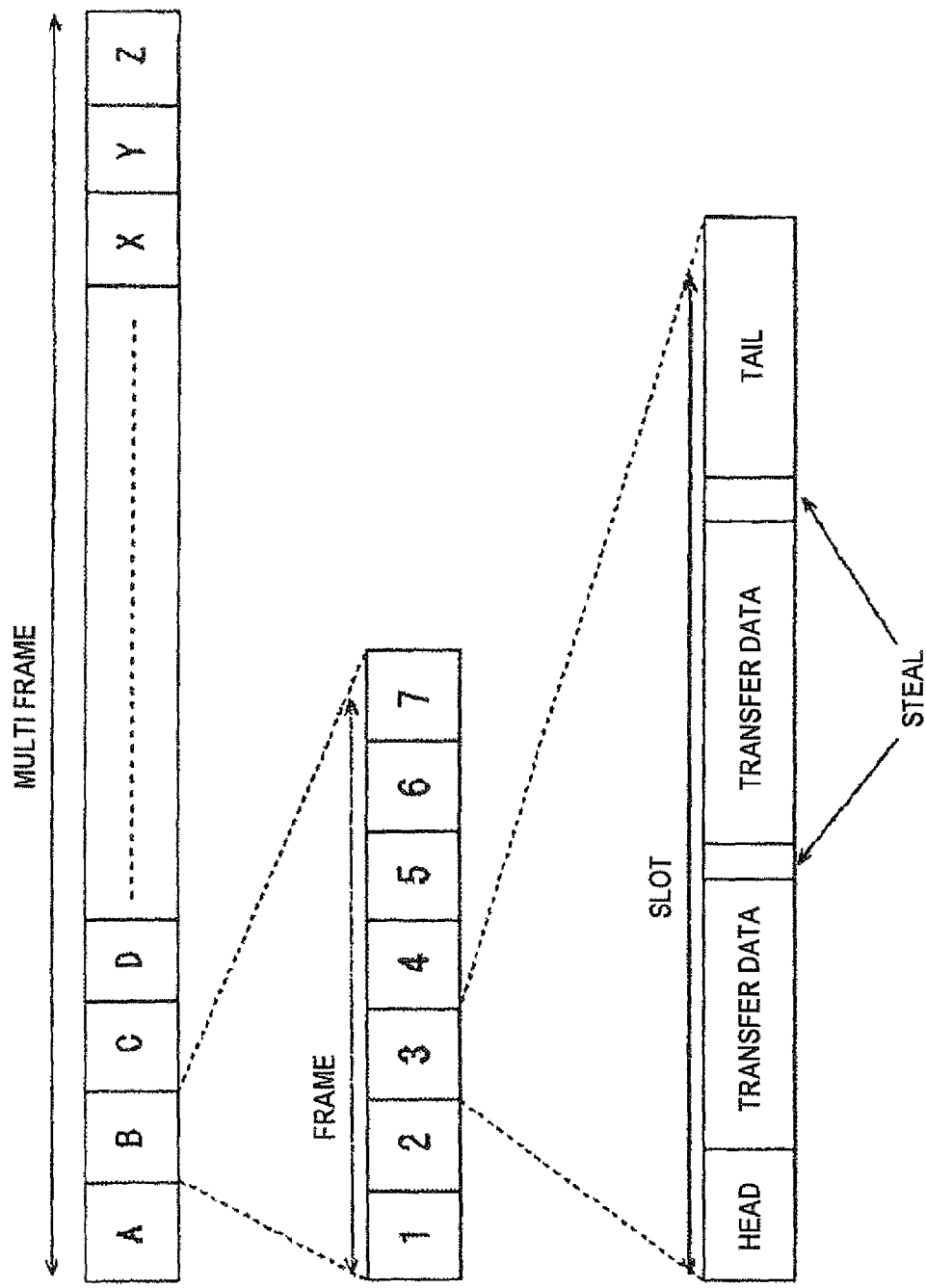
FIG. 6 is a diagram illustrating a frame format of GSM used in Embodiment 1 of the invention.

FIG. 6 is a diagram illustrating a frame format of the GSM employed in Embodiment 1 of the invention.

As illustrated in FIG. 6, similarly to the DECT system, the GSM system is based on a time division multiplex system and realizes multiple communication from a base station on a time division basis using the same frequency for a plurality of terminals.

Figure 7:
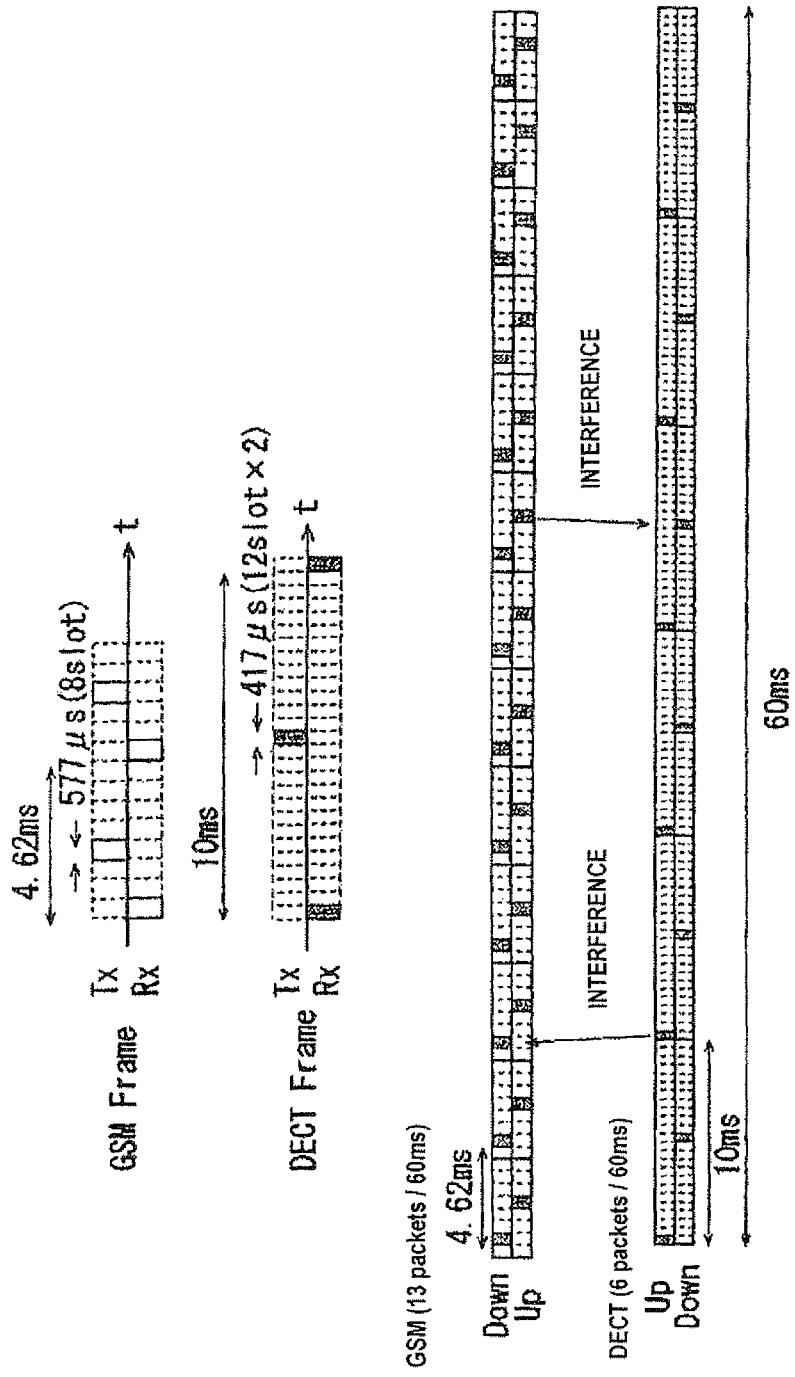
FIG. 7 is a diagram explaining collision in time between the GSM and the DECT that may occur in Embodiment 1 of the invention.

FIG. 7 is an explanatory diagram of collision in time between the GSM and the DECT that may occur in Embodiment 1 of the invention and illustrates frame cycles and interference between signals.

As illustrated in FIG. 7, the frame cycle of the GSM is 4.62 ms and the frame cycle of the DECT is 10 ms, and hence, there is always an instant of collision of signals on a cycle of 60 ms, which causes frequency interference. In a time period of this interference, the probability of normal reproduction decoding of data is slight, and transmitted voice data is harmfully affected.

Figure 8:
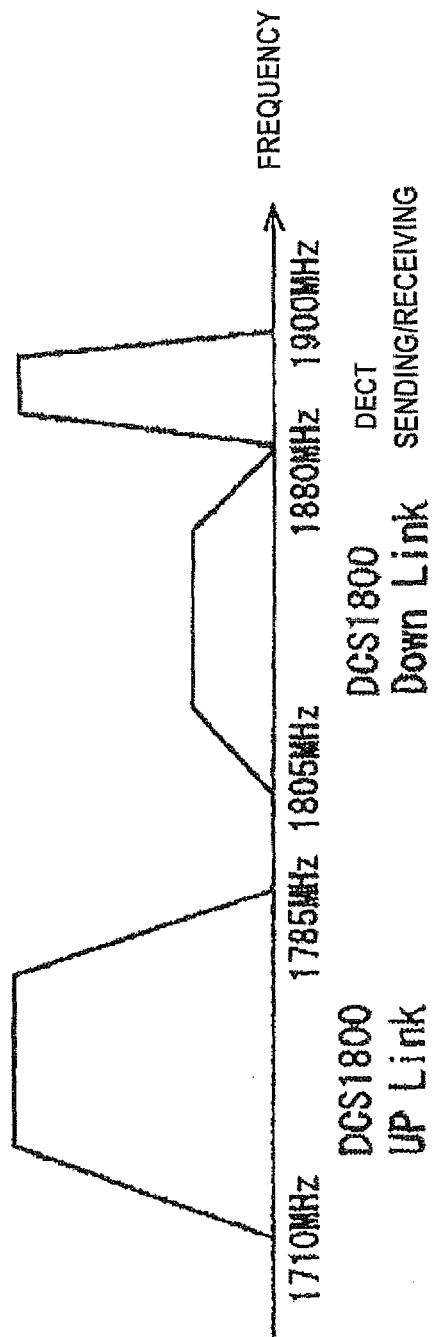
FIG. 8 is an explanatory diagram of frequency interference that may occur in Embodiment 1 of the invention.

FIG. 8 is an explanatory diagram of frequency interference that may occur in Embodiment 1 of the invention and illustrates transfer frequencies of the GSM and the DECT by taking European radio wave standards as an example.

As illustrated in FIG. 8, in Europe, the frequency of the GSM is 1710 MHz through 1880 MHz (transmit frequency: 1710 through 1785 MHz and receive frequency: 1805 through 1880 MHz) and the frequency of the DECT is 1880 through 1900 MHz.

Accordingly, when these systems are employed in parallel for communication within one terminal, the radio frequencies are close to each other, and hence, there arises signal interference through spread of adjacent signals. In voice communication, this interference causes periodical noise during the communication and is output as harsh sound.

In this embodiment, in order to avoid such a phenomenon, even when the two radio modems perform communication independently of each other in the terminal equipment 102, data communication time of the first communication means (for the DECT) is controlled so as not to collide with that of the second communication means (for the GSM) by utilizing spare time when the second communication means is not performing the communication, and thus, the signal interference is avoided, thereby realizing satisfactory data communication.

Figure 9:
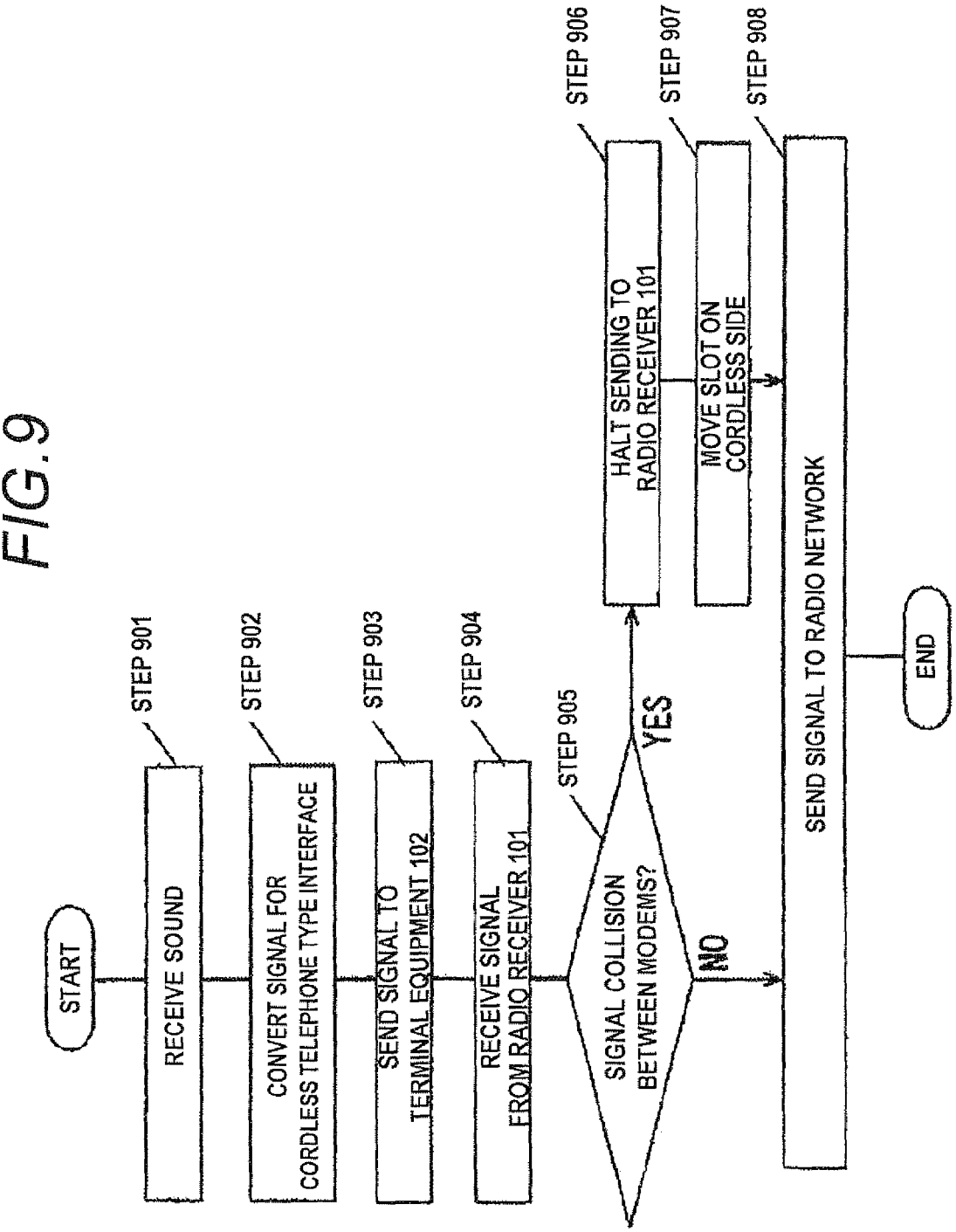
FIG. 9 is an operation flowchart for the terminal equipment of Embodiment 1 of the invention.

FIG. 9 is an operation flowchart for the communication system according to Embodiment 1 of the invention and mainly illustrates the operation of the terminal equipment 102.

In FIG. 9, telephone communication is transmitted/received by the radio receiver 101 and the terminal equipment 102, and open connection between the radio receiver 101 and the terminal equipment 102 and open connection between the terminal equipment 102 and the GSM network are accomplished.

In step 901, a user speaks to the microphone of the radio receiver 101.

In step 902, the radio receiver 101 processes the thus obtained voice signal and converts the voice signal into a signal formatted for a telephone interface between the radio receiver 101 and the terminal equipment 102.

In step 903, the radio receiver 101 transmits the formatted signal to the terminal equipment 102. The radio receiver 101 transmits the formatted signal to the terminal equipment 102 by using the antenna 302 through its own modem.

In step 904, the terminal equipment 102 receives the signal from the radio receiver 101 through the first antenna 202, and processes the received signal by using the first radio communication interface 204 and the domestic radio modem 206.

In step 905, the terminal equipment 102 converts the receive signal from the radio receiver 101 into a signal formatted for a radio wave interface between the terminal equipment 102 and the GSM network. In Embodiment 1, the terminal equipment 102 allows the modem controller 208 to pass the signal from the domestic radio modem 206 to the subscriber channel radio modem 207 and to process and modulate the signal for the GSM in the subscriber channel radio modem 207. Incidentally, when a signal received from the radio base station 103 is to be transmitted to the radio receiver 101, the flow of the processing is reverse.

Furthermore, in step 905, the modem controller 208 receives control information including a communication cycle with the radio receiver 101 from the domestic radio modem 206 included in the terminal equipment 102, and receives control information including a receive period of receive signal data from the radio base station 103 calculated on the basis of control data of a receive signal received from the base station 103 in the subscriber channel radio modem 207.

Figure 10:
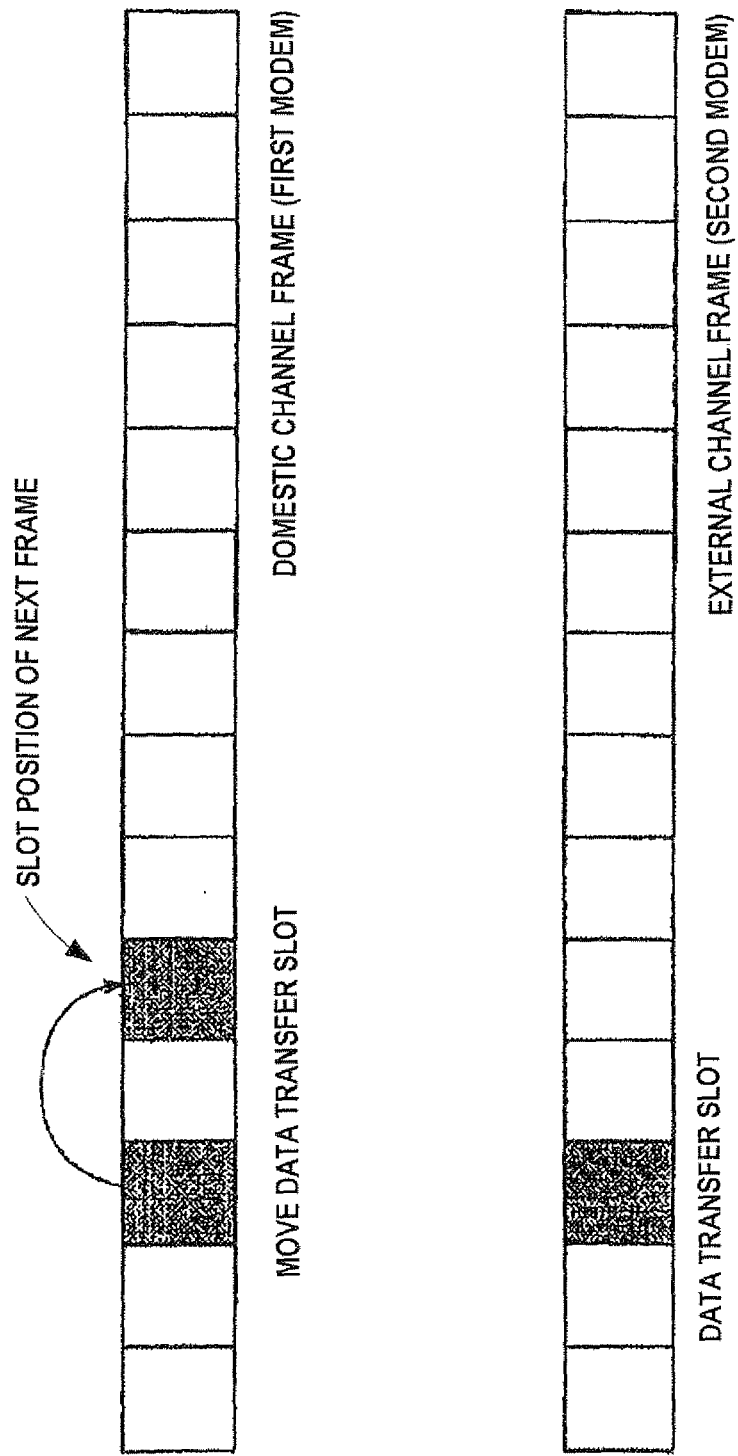
FIG. 10 is an explanatory diagram of a data frame employed in Embodiment 1 of the invention.

When the modem controller 208 determines that transmitting timing of the domestic radio modem 206 collides with receiving timing of the subscriber channel radio modem 207, namely, data slots of frames of these modems collide with each other in time, as illustrated in FIG. 10, the processing proceeds to step 906.

In step 906, when the modem controller 208 determines that the data slots of the modems collide with each other in time, it informs the domestic radio modem 206 of the collision, and the domestic radio modem 206 halts data transmitting to the radio receiver 101. Specifically, the first communication controller 407 informs the first duplexer switch 402 of the collision so as to halt the transmitting.

Furthermore, in step 907, the domestic radio modem 206 controls a control slot and a data slot in a next frame slot. Specifically, the domestic radio modem 206 allocates a data slot to a slot not colliding in time in the next frame of the radio receiver 101, and rewrites a control slot about position information of the allocated slot. Thus, the terminal equipment 102 can select a communication slot not colliding in communication time and inform the radio receiver 101 of it.

In step 908, when it is determined in step 905 that the signals do not collide with each other or after completing a series of processing performed in step 907 when it is determined that the signals collide with each other in time, the terminal equipment 102 transmits the signal to the radio receiver 101.

Although the modem controller 208 issues a control directive to the domestic radio modem 206 when data slots of a transmitting frame to the radio receiver 101 and a receive frame from the radio base station 103 collide with each other in time, discrimination of the collision in time may be made not only as timing of actual collision but also as timing immediately or rather before the collision between data slots predicted based on the periods of the modems.

Furthermore, although a transmitting frame to the radio receiver 101 is described to be controlled in the above, a receive frame from the radio receiver 101 may be similarly controlled. Also, although a receive frame from the radio base station 103 is described to be controlled in the above, a transmitting frame to the radio base station 103 may be similarly controlled.

As described so far, since the first radio connection system (the DECT) and the second radio connection system (the GSM) are different in the time period in Embodiment 1,the modem controller 208 of the terminal equipment 102 monitors collision on a time axis between receive signals from both the domestic radio modem 206 and the subscriber channel radio modem 207 so as to perform the control as described above, and thus, the terminal equipment 102 capable of avoiding the frequency interference while performing communications through the first radio connection and the second radio connection in parallel can be realized.

(Embodiment 2)

Embodiment 2 of the invention will now be described.

Figure 11:
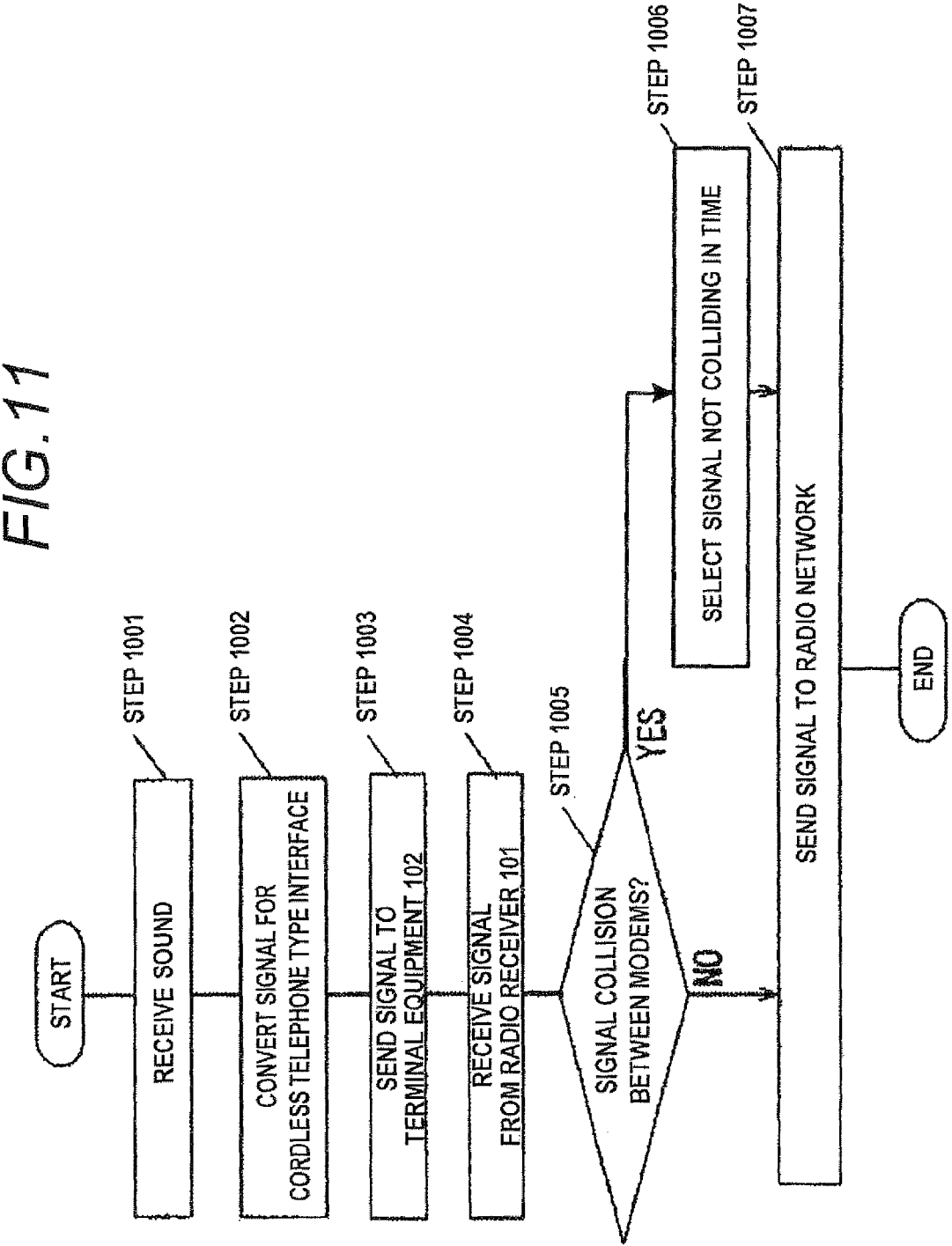
FIG. 11 is an operation flowchart for the terminal equipment according to Embodiment 2 of the invention.

FIG. 11 is an operation flowchart for a communication system according to Embodiment 2 of the invention and mainly illustrates an operation of the terminal equipment 102.

Figure 12:
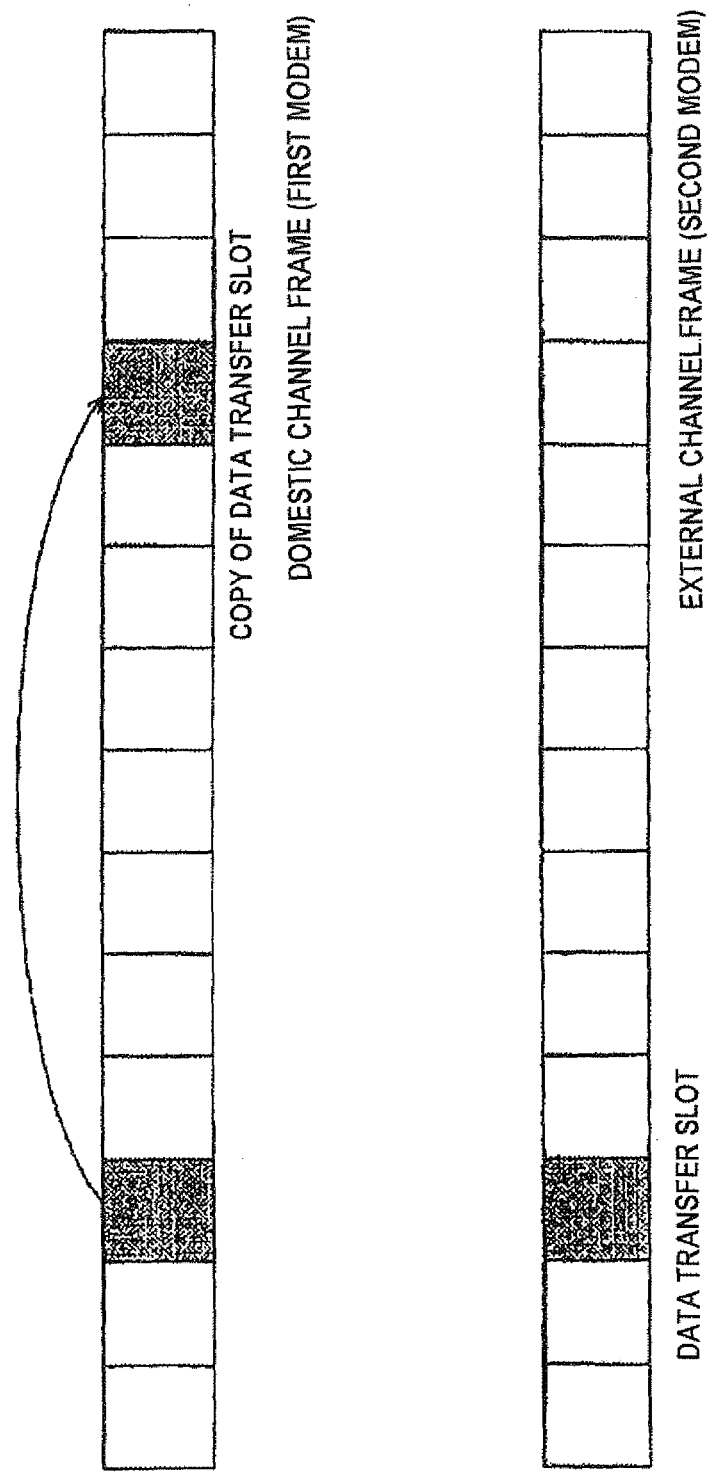
FIG. 12 is an explanatory diagram of a data frame employed in Embodiment 2 of the invention.

In this embodiment, with respect to frames transmitted between the radio receiver 101 and the terminal equipment 102, the same data as that included in a given data slot is copied by the domestic radio modem 206 into another slot of the same frame as illustrated in FIG. 12.

In FIG. 11, processing performed in steps 1001 through 1004 is the same as the processing performed in steps 901 through 904 (illustrated in FIG. 9) of Embodiment 1.

In step 1005, the terminal equipment 102 converts a receive signal from the radio receiver 101 into a signal formatted for the radio wave interface between the terminal equipment 102 and the GSM network. In Embodiment 2, the terminal equipment 102 allows the modem controller 208 to pass the signal from the domestic radio modem 206 to the subscriber channel radio modem 207 and to process and modulate the signal for the GSM in the subscriber channel radio modem 207. Incidentally, when a signal received from the radio base station 103 is to be transmitted to the radio receiver 101, the flow of the processing is reverse.

The modem controller 208 receives control information including a communication cycle with the radio receiver 101 from the domestic radio modem 206 included in the terminal equipment 102, and receives control information including a receive period of receive signal data from the radio base station 103 calculated on the basis of control data of a receive signal received from the base station 103 in the subscriber channel radio modem 207.

When the modem controller 208 determines that transmitting timing of the domestic radio modem 206 collides with receiving timing of the subscriber channel radio modem 207, namely, data slots of frames of these modems collide with each other in time, as illustrated in FIG. 12, the processing proceeds to step 1006.

In step 1006, when the modem controller 208 determines that the data slots of the modems collide with each other in time, it informs the domestic radio modem 206 of the collision, and the domestic radio modem 206 performs control for avoiding the collision of the data slots.

Specifically, as illustrated in FIG. 12, in the frame format of the domestic channel, transmit/receive data is communicated twice in slots away from each other in time within the same frame, and when the modem controller 208 informs of the collision, data of the colliding data slot is discarded and information of a control slot is rewritten so that a data slot containing the same data and away from the colliding slot in time may be selected by the radio receiver 101.

In step 1007, when it is determined in step 1005 that the cordless type telephone communication and the subscriber channel communication do not collide with each other or after completing a series of processing performed in step 1006 when they collide with each other in time, the signal is transmitted to the radio network of the subscriber channel.

It is noted that the number of slots for containing the same data in one frame is not limited to two but may be set to three or more.

Although the receiving from the subscriber channel and the transmitting from the cordless telephone is exemplarily described in Embodiment 2, the receiving of the subscriber channel radio modem 207 and the receiving of the domestic radio modem 206, the transmitting of the subscriber channel radio modem 207 and the transmitting of the domestic radio modem 206, and the transmitting of the subscriber channel radio modem 207 and the receiving of the cordless telephone may be similarly controlled.

(Embodiment 3)

Embodiment 3 of the invention will now be described.

Figure 13:
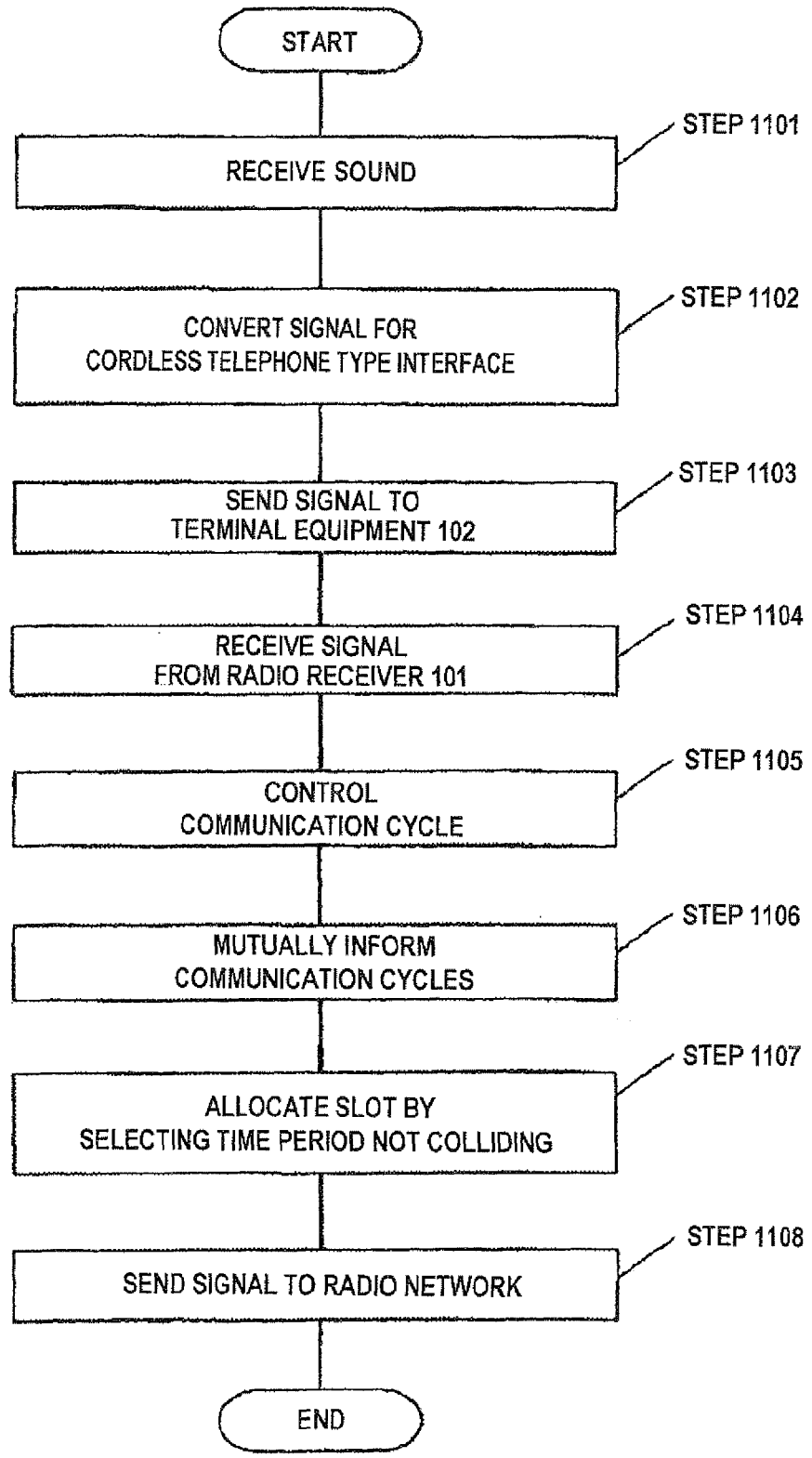
FIG. 13 is an operation flowchart for the terminal equipment according to Embodiment 3 of the invention.

FIG. 13 is an operation flowchart for a communication system according to Embodiment 3 of the invention and mainly illustrates an operation of the terminal equipment 102.

In FIG. 11, processing performed in steps 1101 through 1104 are the same as the processing performed in steps 901 through 904 (illustrated in FIG. 9) of Embodiment 1.

In step 1105, the terminal equipment 102 converts a receive signal from the radio receiver 101 into a signal formatted for the radio wave interface between the terminal equipment 102 and the GSM network. In Embodiment 3, the terminal equipment 102 allows the modem controller 208 to pass the signal from the domestic radio modem 206 to the subscriber channel radio modem 207 and to process and modulate the signal for the GSM in the subscriber channel radio modem 207. Incidentally, when a signal received from the radio base station 103 is to be transmitted to the radio receiver 101, the flow of the processing is reverse.

Furthermore, at the same time, the domestic radio modem 206 controls a communication cycle with the radio receiver 101.

In step 1106, the subscriber channel radio modem 207 is informed by the modem controller 208 of the communication cycle and transmitting/receiving slot timing of the domestic radio modem 206. Also, the domestic radio modem 206 is informed by the modem controller 208 of the communication cycle and transmitting/receiving slot timing of the subscriber channel radio modem 207.

In step 1107, since the domestic radio modem 206 can grasp the communication cycle and the transmitting/receiving timing of the subscriber channel radio modem 207, it freely controls the transmitting/receiving timing between the radio receiver 101 and the terminal equipment 102 by selecting a slot position not colliding with communication on the GSM side on a time axis within the same frame and holding the position information of the selected data slot in a control slot.

In step 1108, the domestic radio modem 206 controls the transmitting/receiving timing to the radio receiver 101, so as to perform the transmitting/receiving in time not colliding with the transmitting/receiving timing of the subscriber channel radio modem 207.

Figure 14:
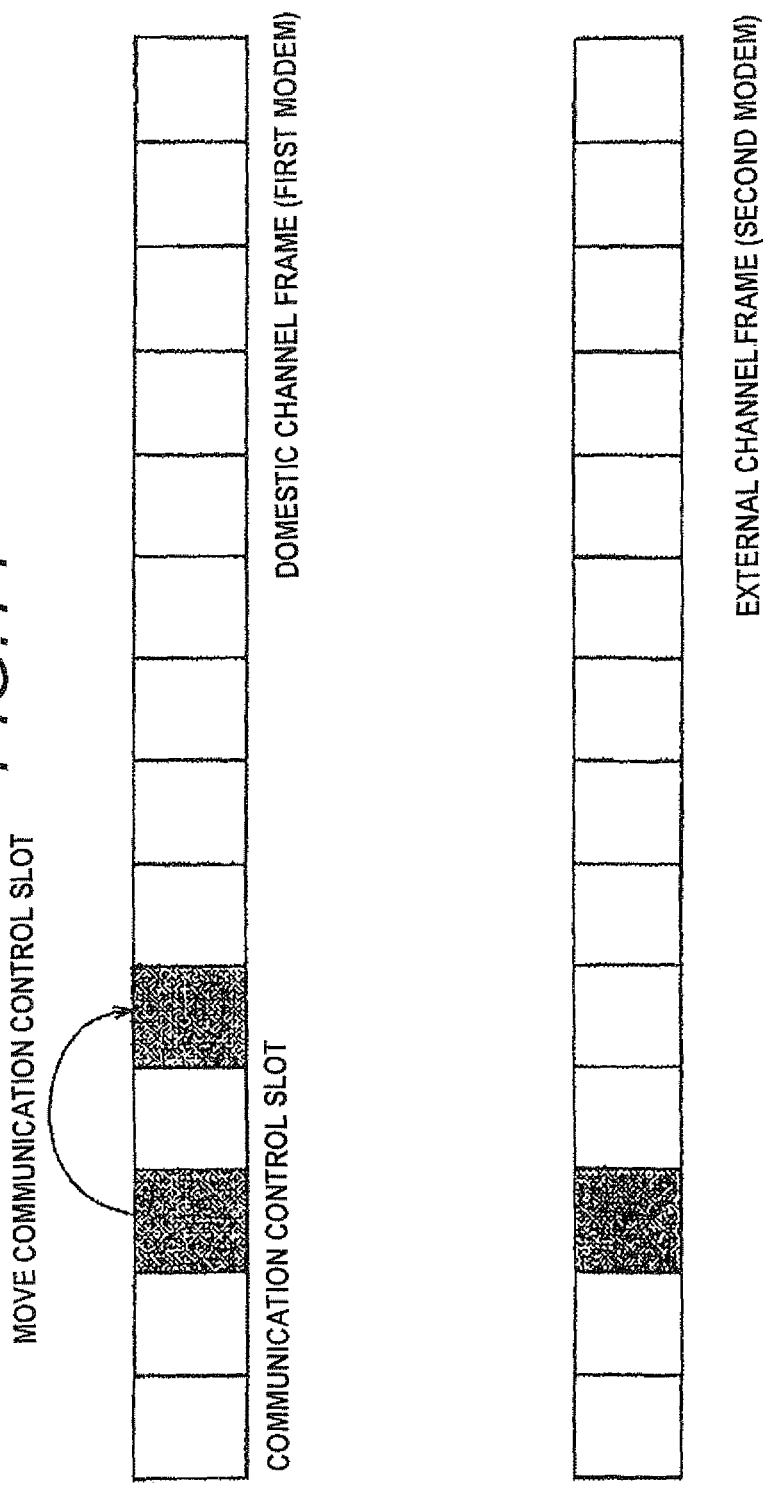
FIG. 14 is an explanatory diagram of a data frame employed in Embodiment 3 of the invention.

Incidentally, although the change of the position of a data slot is described in Embodiment 3, a control slot used for controlling the radio receiver 101 may be freely selected within the same frame as illustrated in FIG. 14, so as to always retain synchronization between the terminal equipment 102 and the radio receiver 101 while also avoiding the interference between control slots.

(Embodiment 4)

Embodiment 4 will now be described.

Figure 15:
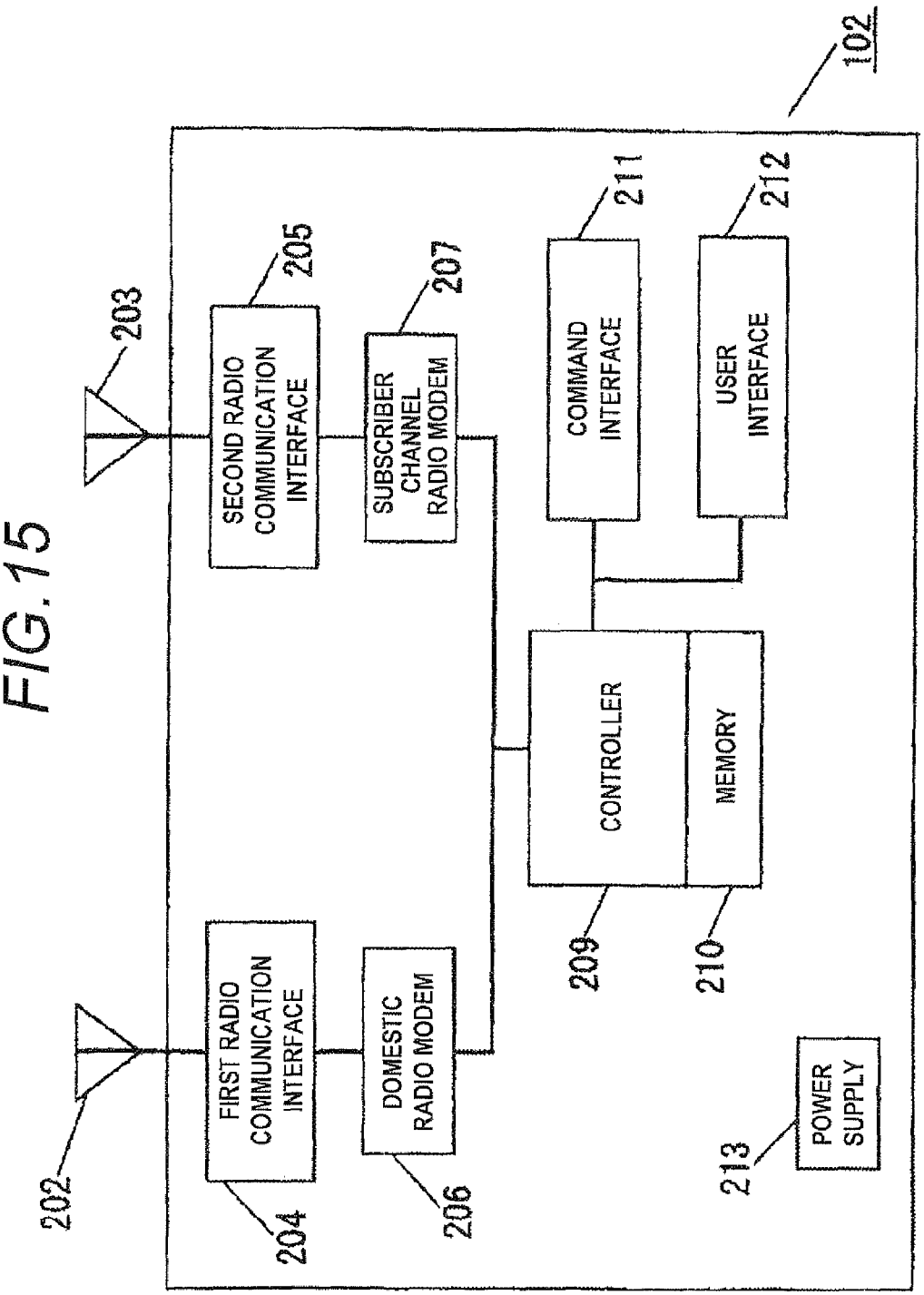
FIG. 15 is a configuration diagram of a terminal equipment according to Embodiment 4 of the invention.

In each of Embodiments 1 through 3, the information of the communication cycles of the domestic radio modem 206 and the subscriber channel radio modem 206 is transmitted through the modem controller 208. In Embodiment 4, the data relay between the domestic radio modem 206 and the subscriber channel radio modem 207 is performed by the controller 209 as illustrated in FIG. 15.

Thus, the load of the control performed by each modem is reduced, and even when the control performance of each modem is low, the load of each modem may be reduced and an unstable factor of an operation performed in emergency may be appropriately eliminated through the centralized control by the controller 209.

In the terminal equipment of each of Embodiments 1 through 4, assuming that the domestic radio modem 206 and the subscriber channel radio modem 207 are housed in the terminal equipment 102, that the radio frequencies are close to each other in making an outside call by the radio receiver 101 through the terminal equipment 102 by using the subscriber channel radio waves, and that the both radio communication systems employ the Time Division Multiple Access, the collision of the timing for transmitting/receiving data along the time axis direction can be avoided, and hence, degradation of voice such as frequency interference and data error may be avoided, resulting in providing a suitable communication environment.

Moreover, in the terminal equipment 102 of each of Embodiments 1 through 4, the measurement of a received signal strength indicator (RSSI) generally employed as the modem signal processing is utilized, and the RSSI obtained from the domestic radio modem 206 and the subscriber channel radio modem 207 may be monitored by the modem controller 208 for the discrimination of data collision.

Furthermore, the terminal equipment 102 of each of Embodiments 1 through 4 is a terminal obtained by replacing and combining, with the subscriber channel radio communication, the public switched telephone network (PSTN) of an existing telephone, that is, the PSTN wired to a domestic cordless telephone terminal, and therefore, it is possible to provide communication and a data communication environment suitable for a place where it is difficult to lay subscriber channel wiring or for a user always moving with the terminal equipment 208.

In addition, in each of Embodiments 1 through 4, an exemplary case where the means for controlling the data collision timing in the terminal equipment 102 is mainly the modem controller 208 is described, but it goes without saying that the scope of the invention includes a case where the means is included in either of the two modems included in the terminal equipment 102.

The present invention has been explained in detail with reference to the particular embodiments. However, it is obvious for those skilled in the art that various variations and modifications can be applied without departing from the spirit and the scope of the present invention.

This application is based upon and claims the benefit of priority of Japanese Patent Application No. 2007-156031 filed on Jun. 13, 2007, the contents of which are incorporated herein by reference in its entirety.

Industrial Applicability

The radio communication apparatus of the present invention is applicable to not only electronic equipment for a cellular phone or radio LAN and a set-top box (STB) but also a communication system for radio delivering images, voice, data and telephone calls.

The invention claimed is:

1. A radio communication apparatus for performing radio communication in a first frequency band and a second frequency band, the radio communication apparatus comprising:
a first modem which modulates/demodulates a first frequency band signal;
a second modem which modulates/demodulates a second frequency band signal; and
a modem controller which determines on the basis of information supplied from the first and second modems that transmitting/receiving timing of first radio communication collides with transmitting/receiving timing of second radio communication and which directs the first modem to avoid collision of data on a time axis,
wherein the first modem is configured to control communication of frame data in which the same data is allocated to a plurality of communication slots, and in receiving a directive from the modem controller that transmitting/receiving timing of the second modem collides with transmitting/receiving timing of the first modem, the first modem discards the data contained in a colliding communication slot and rewrites a control data sent to a radio receiver of the frame data for directing the radio receiver to select another communication slot of the allocated communication slots containing the same data within the frame data.

2. The radio communication apparatus according to claim 1, wherein the first modem employs a Time Division Multiple Access as a communication system.

3. The radio communication apparatus according to claim 1, wherein the modem controller determines whether or not the transmitting/receiving timings collide with each other on the basis of transmit/receive control information obtained from the first and second modems.

4. The radio communication apparatus according to claim 1, wherein the modem controller determines whether or not the transmitting/receiving timings collide with each other on the basis of received signal strength input from the first and second antennas obtained from the first and second modems.

5. The radio communication apparatus according to claim 3, wherein the first modem baits transmitting in receiving a directive from the modem controller that receiving timing of the second modem collides with transmitting timing thereof.

6. The radio communication apparatus according to claim 5, wherein the first modem changes a position of data in a next frame and incorporates a content of change into control data.

7. The radio communication apparatus according to claim 2, wherein the modem controller determines whether or not the transmitting/receiving timings collide with each other on the basis of transmit/receive control information obtained from the first and second modems.

8. The radio communication apparatus according to claim 2, wherein the modem controller determines whether or not the transmitting/receiving timings collide with each other on the basis of received signal strength input from the first and second antennas obtained from the first and second modems.

9. The radio communication apparatus according to claim 7, wherein the first modem halts transmitting in receiving a directive from the modem controller that receiving timing of the second modem collides with transmitting timing thereof.

10. The radio communication apparatus according to claim 4, wherein the first modem halts transmitting in receiving a directive from the modem controller that receiving timing of the second modem collides with transmitting timing thereof.

11. The radio communication apparatus according to claim 8, wherein the first modem halts transmitting in receiving a directive from the modem controller that receiving timing of the second modern collides with transmitting timing thereof.

12. The radio communication apparatus according to claim 9, wherein the first modem changes a position of data in a next frame and incorporates a content of change into control data.

13. The radio communication apparatus according to claim 10, wherein the first modem changes a position of data in a next frame and incorporates a content of change into control data.

* * * * *